June 29, 1926.

H. T. WOOLSON

CLUTCH BRAKE

Filed Dec. 28, 1925

1,590,791

Inventor
Harry T. Woolson
By Irving Harness
Attorney

Patented June 29, 1926.

1,590,791

UNITED STATES PATENT OFFICE.

HARRY T. WOOLSON, OF DETROIT, MICHIGAN.

CLUTCH BRAKE.

Application filed December 28, 1925. Serial No. 77,969.

It is the primary object of my invention to provide a simple and economical device for reducing the speed of rotation of a shaft positioned between the flywheel and transmission of the conventional type of motor vehicle when the clutch which connects the flywheel with the shaft has been released. The purpose of this speed reduction of the shaft is to facilitate the meshing of the transmission gears.

With the above and other objects in view, my invention consists in the arrangement, combination and construction of the various parts of my improved device as described in the specification, claimed in my claims and shown in the accompanying drawings, in which:

Figure 1:
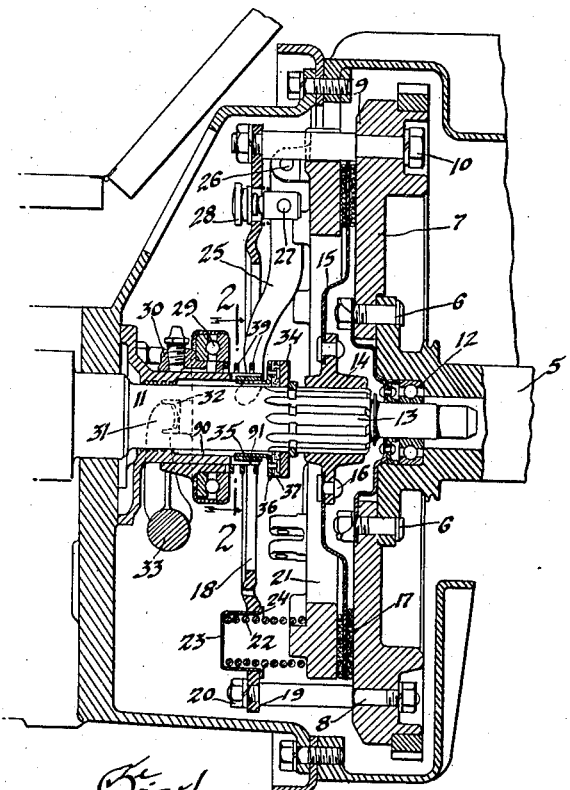
Fig. 1 is a sectional view of a clutch and its associated parts illustrating my invention.
Figure 2:
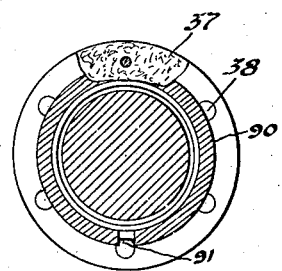
Fig. 2 is a view illustrating the braking device utilized in my invention taken on line 2—2 of Fig. 1.

I have shown a shaft 5 connected as by studs 6 with a flywheel 7. A plurality of bolts 8 are secured to the flywheel 7 by means of the shoulders 9 on the bolts and lock washers and nuts 10.

I also provide a shaft 11 journaled in a bearing 12 within the shaft 5 and having splines 13 thereon. Fixed to the splines 13 is a collar 14 having a clutch plate 15 secured thereto as at 16. The plate 15 is provided with suitable facing 17 on either side thereof.

Positioned on the rearward ends of the bolts 8 is a plate 18 bearing against shoulders 19 on one side thereof and secured by nuts and washers 20 on the other side thereof.

A pressure plate 21 is normally held against the rearward facing 17 on the clutch plate 15 by means of a plurality of coiled springs 22 held in place by cups 23 secured to the plate 18 as at 24.

It will be thus seen that normal rotation of the shaft 5 will be imparted to the shaft 11 through the clutch plate 15 and its facing 17 by reason of the pressure plate 21 being held against one side of the clutch plate 15.

A plurality of levers 25 are provided, being pivotally connected as at 26 to the pressure plate 21 and connected intermediate their ends as at 27 to a stud 28 on the plate 18. The free ends of the levers 25 are adapted to bear against the face of a thrust bearing 29 mounted on the collar 30. The collar 30 is positioned around the shaft 11 and adapted to be moved longitudinally of the shaft by means of a finger 31 engaging a flange 32 on the collar, operated by a shaft 33 which may be suitably connected with the conventional clutch pedal of the conventional motor vehicle. Thus when the finger 31 is pressed against the flange 32 the collar 30 and its bearing 29 will be moved forwardly of the shaft 11 against the lever 25 so as to pull the pressure plate 21 away from the facing 17 on the clutch plate 15 and disconnect the shafts 5 and 11.

When this is done it is desirable to lessen the speed of rotation which will have been built up in the shaft 11, and I have provided a plate 34 fixed for rotation with the shaft 11 and a sleeve 35 mounted within the rearward end of the member 90, and keyed thereto through the slot 91, is arranged around the shaft 11. The sleeve 35 has a flanged portion 36 provided with a facing 37 secured thereto as at 38 in abutting relation to the plate 34.

A coiled spring 39 is positioned around the shaft 11 between the sleeve 30 and flange 36 of the sleeve 35. The spring 39 is so tensioned as to normally exert little or no pressure against the flange 36 in the position shown in Fig. 1. When the sleeve 30 is moved forwardly however, to release the clutch and disconnect the shafts 5 and 11, the spring 39 will be compressed so as to cause the flange 36 and its facing 37 to bear with increased pressure against the plate 34 so as to have a braking effect upon the shaft 11 and tend to decrease the speed of rotation thereof.

It will be apparent that various changes may be made in the arrangement, combination and construction of the various parts of my improved device without departing from the spirit of my invention and it is my intention to cover by my claims such changes as may be reasonably included within the scope thereof.

What I claim is:

1. In combination, a driven shaft, a driving shaft and a clutch, a member slideable longitudinally of one of said shafts for operating said clutch to clutch and unclutch said shafts to each other, a brake comprising a member fixed to the driven shaft and a member movable thereon, a coil spring interposed between the slideable member and the movable member, adapted to be compressed when the slideable member is actuated to unclutch said shafts and thereby force said movable member against said fixed member and brake the driven shaft.

2. In combination, a driven shaft having splines thereon, a clutch plate fixed on said splines, a driving shaft having means thereon adapted to cooperate with said plate to clutch said shafts together, a slideable member disposed around the driven shaft, means for actuating the slideable member and means connecting it with said clutching elements whereby sliding thereof may clutch and unclutch said shafts, a brake member secured to the splines on the driven shaft, a second brake element slideable along the driven shaft, and means connecting said second brake element and said slideable member, whereby movement of the latter to unclutch the shafts will move the second brake element to bear against the fixed brake element.

3. In combination, a driven shaft having splines thereon, a clutch plate fixed on said splines, a driving shaft having means thereon adapted to cooperate with said plate to clutch said shafts together, a slideable member disposed around the driven shaft, means for actuating the slideable member and means connecting it with said clutching elements whereby sliding thereof may clutch and unclutch said shafts, a brake member secured to the splines on the driven shaft, a second brake element slideable along the driven shaft, and a coiled spring connecting said second brake element and said slideable member, whereby movement of the latter to unclutch the shafts will move the second brake element to bear against the fixed brake element.

HARRY T. WOOLSON.